United States Patent
Weinstein

[15] 3,662,477
[45] May 16, 1972

[54] EDUCATIONAL AID

[72] Inventor: Harold Weinstein, 1820 Avenue V, Brooklyn, N.Y. 11229

[22] Filed: Jan. 4, 1971

[21] Appl. No.: 103,594

[52] U.S. Cl. ................................35/9 R, 35/35 H
[51] Int. Cl. ..........................................G09b 1/08
[58] Field of Search.............35/7 A, 9 R, 35 R, 35 H, 73

[56] References Cited

UNITED STATES PATENTS 3,010,228  11/1961  Torre ..................................35/7 A X Primary Examiner—Wm. H. Grieb
Attorney—Brufsky, Staas, Breiner & Halsey

[57] ABSTRACT

An educational aid including a coded card and a problem card containing a plurality of educational problems and the answers thereto superimposed and aligned on an easel. The coded card includes a plurality of magnetic and non-magnetic portions. The magnetic portions are arranged so as to lie in back of individual indicum on the problem card which if selected by a student as an answer to an educational problem will provide a composite answer. The student selects the individual indicum by placing a magnet on the problem card covering the selected indicum. Should the indicum selected be correct, the magnet will adhere to the problem card. Otherwise, it will slide from the card indicating immediately to the student that the particular indicum selected is incorrect. The coded card is rectangular in shape and therefore can be rotated through 90° intervals to present a different relative orientation of the magnetic and non-magnetic portions for use with a plurality of problem cards.

12 Claims, 6 Drawing Figures

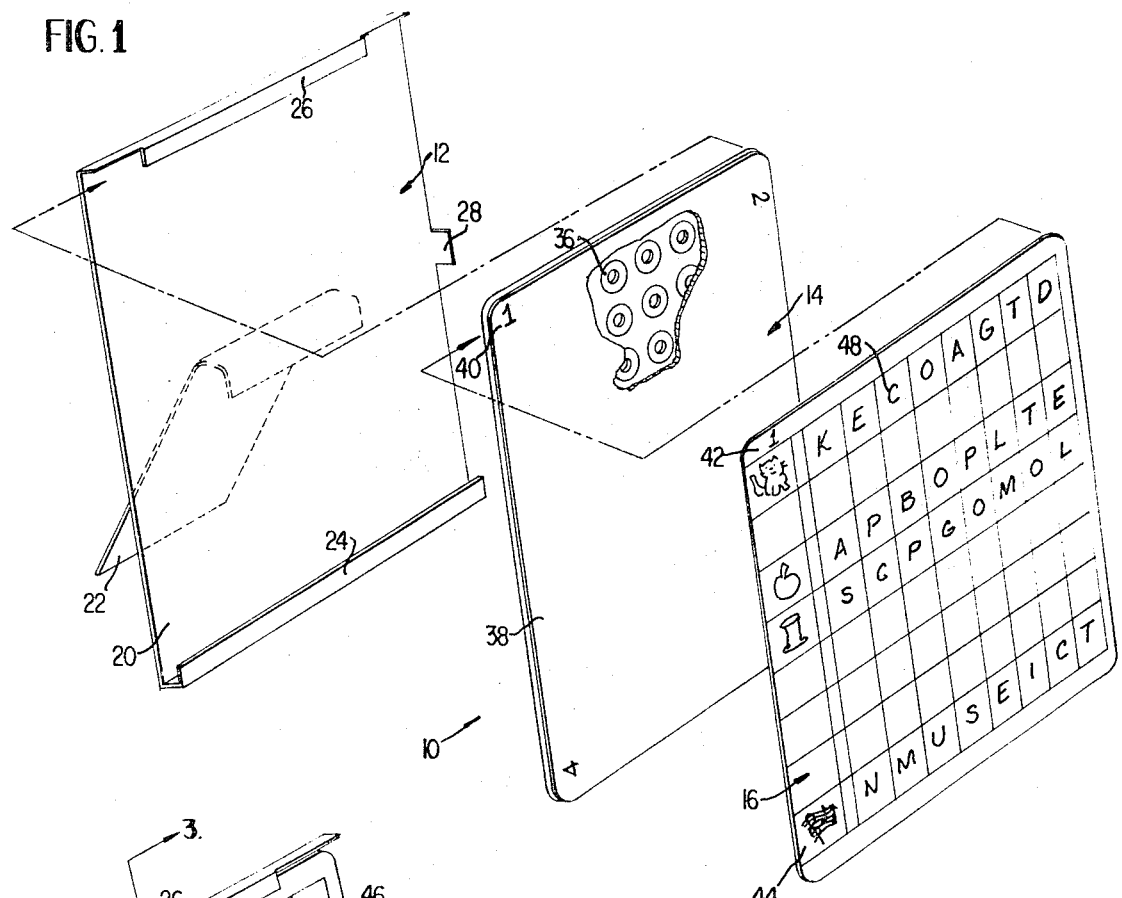
FIG. 1
FIG. 2
FIG. 4
INVENTOR
HAROLD WEINSTEIN
BY 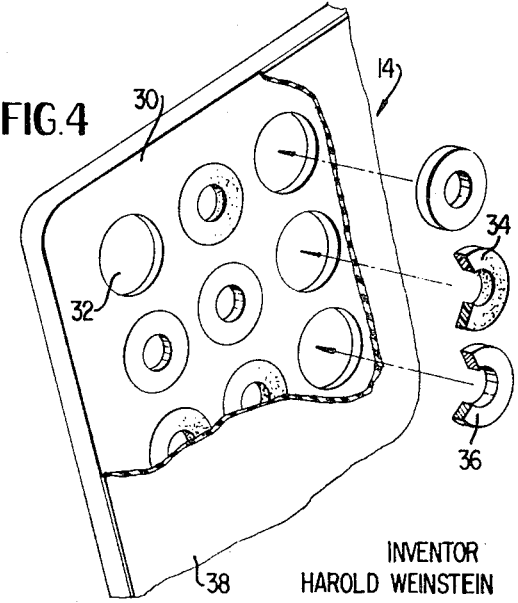
ATTORNEYS

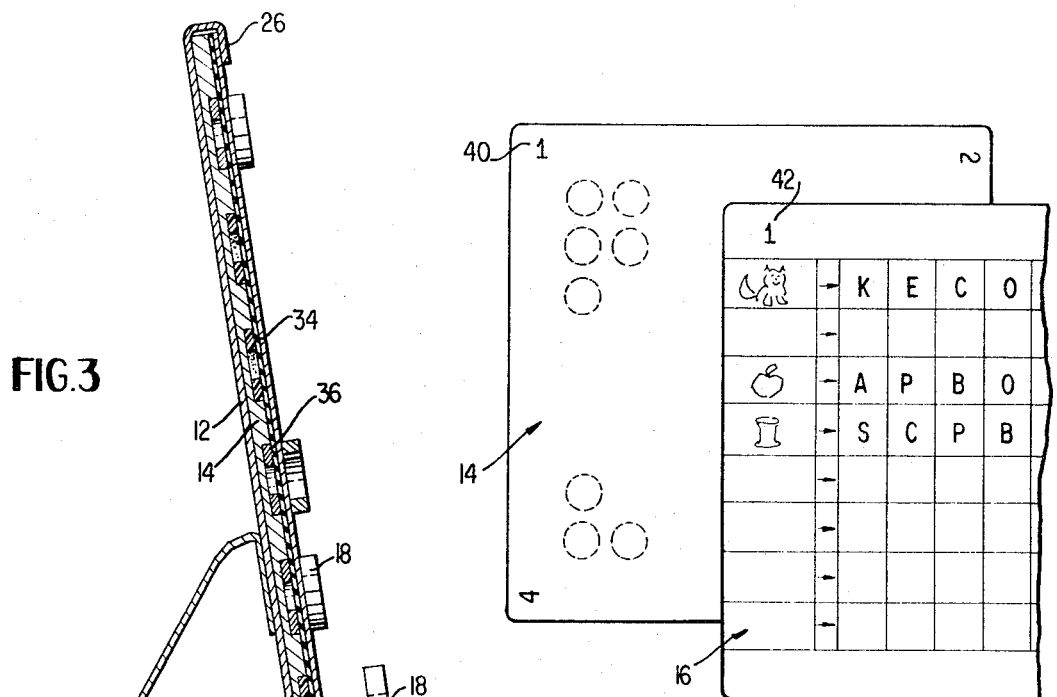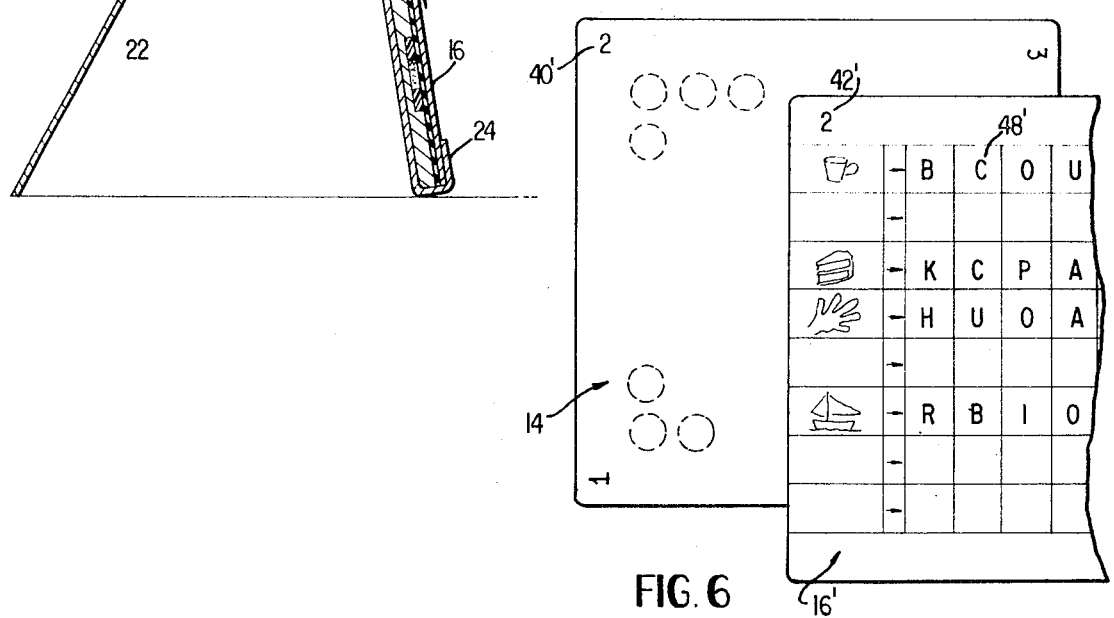

EDUCATIONAL AID

BACKGROUND AND SUMMARY OF THE INVENTION

This invention relates generally to the field of educational apparatus and more particularly, to a portable educational aid for use in teaching children a variety of subjects such as language, history, geography, arithmetic, spelling, reasoning, reading coordination, and the like, which is further characterized by its simplicity of construction.

Briefly, the invention consists of a coded card and a problem card adapted to be aligned and positioned in superimposed relation on an easel. The coded card is substantially flat and has a plurality of magnetic and non-magnetic portions arranged thereon in a predetermined array or code. The magnetic and non-magnetic portions may take a variety of forms such as embedded plastic and iron washers interchangably positioned within holes formed in a surface of the card, magnetizable squares in a checkerboard array on the card surface secured thereto by a suitable adhesive, or a magnetizable sheet in which holes are cut to provide non-magnetic portions. The particular array of magnetic and non-magnetic portions are hidden from view by a suitable cover overlying the card surface.

The problem card, also flat, is superimposed on the coded card containing the magnetic and non-magnetic array of elements. The problem card has indicia imprinted thereon representing a plurality of educational problems along with the answers thereto. The answers however consist of the composite of individual indicum adapted to be selected from a set of random, individual indicum adjacent each of the educational problems presented.

When superimposed on the coded card and aligned therewith, the individual indicum making up the composite correct answer to each educational problem on the problem card will lie in front of the magnetic portions of the coded card.

The student is provided with a plurality of magnets and in selecting the answer to each individual problem will attempt to cover the individual indicum which he feels will provide the composite answer to the educational problem. Should the individual indicum selected be correct, the magnet will remain on the problem card. If incorrect, it will not adhere thereto and slide off the selected indicum, indicating to the student that an incorrect selection has been made.

The coded card is rectangular in shape. Accordingly, rotation of the card through 90° intervals will provide a different orientation of the magnetic and non-magnetic portions, from its top to bottom edges. In this manner, four different problem cards can be provided for use with each coded card. Each problem card provided for use with a single coded card will have the answers to its problems arranged and oriented in such a mode so as to correspond to the orientation of the magnetic portions on the coded card, in its particular oriented mode.

For convenience, coded and problem cards are superimposed and aligned on an easel. The easel is provided with a stop for contact with an edge of each card so as to align the cards in such a position that the answers to the problems on the problem card represented by the composite of individual indicum will each be in front of a magnetic portion of the coded card. The easel, being substantially upright, but sloped, also provides means whereby if an incorrect indicum is selected, the magnetic marker will slide downwardly, clearly indicating an incorrect choice.

Accordingly, it is an object of this invention to provide an educational aid.

A further object of this invention is to provide an educational aid which can be used by a student for self-instruction.

A still further object of this invention is to provide an educational aid which is simple in construction, consists of a minimum number of components and which can be used with maximum efficiency for its intended purposes.

Further objects and advantages of the present invention will become apparent from the following description and claims and from the accompanying drawing, wherein:

BRIEF DESCRIPTION OF THE DRAWINGS

FIG. 1 is an exploded perspective view of the educational aid comprising the subject matter of the instant invention;

FIG. 2 is a perspective view, with certain portions removed for purposes of illustration, of the components of the educational aid illustrated in FIG. 1, but in assembled condition ready for use;

FIG. 3 is a cross-sectional view taken substantially along the plane indicated by line 3—3 of FIG. 2;

FIG. 4 is an enlarged fragmentary perspective view of the upper left-hand corner of the coded card portion of the instant invention shown more fully in FIG. 1;

FIG. 5 is a fragmentary front view in elevation of the relative orientation of the coded card and one problem card; and FIG. 6 is a view similar to FIG. 5 except that the coded card is illustrated as having been rotated 90° to provide a different orientation of its coded portions whereby it is adapted to be used with a different problem card, as illustrated.

DESCRIPTION OF THE PREFERRED EMBODIMENT

Referring now to the drawings in detail, wherein like numerals indicate like elements throughout the several views, the educational aid of the present invention is generally illustrated in FIG. 1 by the numeral 10.

Educational aid 10 includes a substantially upright easel 12, a coded card 14 positioned on upright easel 12, and a problem card generally indicated by the numeral 16 which is adapted to be superimposed on the coded card 14 as illustrated more clearly in FIGS. 2 and 3. A plurality of magnets such as 18 are also provided for a purpose which will be described more fully hereinafter.

Easel 12 is provided with a substantially flat or planar surface 20 which is held in substantially upright position by standard 22. Integral with the upper and lower edges of easel 12 are substantially L-shaped flanges 26 and 24 respectively. Extending perpendicular to and outwardly of flat surface 20 of easel 12 is a tab 28 which serves as a stop to properly align superimposed coded card 14 and problem card 16 when positioned on easel 12.

Coded card 14 consists of a plastic or cardboard rectangular sheet of material having a planar surface 30. A plurality of countersunk holes 32 are formed in surface 30. Positioned within each hole 32 is either a non-magnetic, e.g., plastic washer 34 or a magnetic, e.g., iron washer 36. The positions of washers 34 and 36 are interchangeable since they are of the same size and fit snugly within holes 32. Magnetic or iron washers 36 are arranged in such a position upon planar surface 30 so that when problem card 16 is superimposed thereon, iron washers 36 will be directly behind a particular preselected indicum on card 16 which constitutes a portion of a composite answer to a problem posed on problem card 16. A vinyl sheet or covering 38 is adhesively secured to surface 30 of coded card 14 to retain washers 34 and 36 within holes 32 and completes the assembly of card 14. Numbers 1, 2, 3, and 4 are provided in each corner 40 of card 14 to designate and identify the relative orientation of coded card 14.

Problem card 16 is also rectangular in shape. A number in the upper left-hand corner 42 indicates that a particular card 16 is to be used with coded card 14 when the relative orientation of card 14 is such that the number appearing in its upper left-hand corner 40 is identical to that provided on card 16 at 42.

Card 16 includes a plurality of educational problems and the answers thereto. For example, card 16 is specifically illustrated for use as both a spelling aid and reading coordination aid. The student using problem card 16 would be required to both identify and spell the name of the object drawn in column 44 of card 16. The student would be required to choose the correct letters identifying the object from a set of random-appearing indicum provided adjacent each of the objects, such as in row 46. This is accomplished by positioning magnets 18 over individual indicum or letters in row 46 so that the composite selection will spell the name of the object appearing adjacent row 46 in column 44. Magnets 18, being donut shaped, will enable the selected letters to be viewed and exposed to the student.

In use, coded card 14 and problem card 16 are disposed in superimposed positions upon surface 20 of easel 12 with their right-hand edge in abutment against stop 28. Card 16 is selected so that the number appearing in the upper left-hand corner 42 matches the number appearing in the upper left-hand corner 40 of card 14. This assures that when card 16 is superimposed upon card 14 on easel 12 that the individual indicum in rows 46 providing the correct identification of the object in column 44 will be disposed in front of a magnetic washer 36 embedded in surface 30 of card 14.

With cards 14 and 16 in superimposed position on easel 12, the student selects the individual indicum 48 in row 46 which would provide a composite answer to identify the object appearing immediately adjacent the row 46 in column 44. As shown for example in FIG. 2, the word CAT is spelled to identify the object appearing in column 44 in row 46 by positioning magnets 18 over the letters C, A and T appearing in the set of random indicum printed in row 46. The correctness of the answer is indicated by the adherence of magnets 18 to the surface of card 16.

Should any of the individual indicum 48 selected as an answer be incorrect, magnet 18 will have been positioned over one of the non-magnetic washers 34 embedded in card 14. Easel 12 being substantially upright, but sloped, will enable magnet 18 in such a case to slide downwardly. This will immediately indicate to the student that an incorrect letter has been selected and he must try again to select the correct letter which will provide the composite correct answer to identify the object in column 44.

As illustrated in FIGS. 5 and 6 each coded card 14 can be used with four different problem cards, without repositioning of washers 34 and 36 within holes 32. This is accomplished by rotating coded card 14 through 90° intervals thereby reorienting the relative positions of washers 34 and 36 from the top to bottom of card 14 as illustrated in FIG. 6. Each new number appearing in the upper left-hand corner 40 or 40' of card 14 designates a new orientation of the washer elements. Another problem card 16' is then inserted into easel 12 after reorientation of card 14. The number appearing in the upper left-hand corner 42' of card 16' should match the number appearing in the reoriented card 14 in the upper left-hand corner 40' so as to assure that the magnetic portions or washers 36 embedded within card 14 will lie directly behind the correct indicum 48' in each of its rows. Since card 14 is rectangular in shape, four orientations of the washers 34 and 36 are possible, enabling each card 14 to be used with four different problem cards.

While the invention has been described so that the magnets 18 will identify the correct indicia forming a composite answer to identify an object, it is contemplated as being within the purview of the instant invention that solid magnets can be positioned on incorrect indicia to leave the correct letters in view. Further, a single indicum in lieu of a composite of individual indicia, under certain conditions, may provide the correct answer to a problem posed on problem card 16. For example, in simple arithmetic problems, such as 4 − 2 = 2, one indicum only 2 would be covered to indicate the correct answer. Structure to accomplish this objective is also contemplated as being within the scope of the invention.

What is claimed is:

1. An educational aid comprising
   a coded card having a plurality of magnetic and non-magnetic portions arranged thereon in a predetermined array,
   a problem card superimposed on said coded card, said problem card having indicia imprinted thereon representing a plurality of educational problems and the answers thereto, the answers consisting of the composite of individual indicum adapted to be selected from a set of random-appearing individual indicum adjacent each of said educational problems represented on said problem card, each one of said composite of individual indicum providing an answer being positioned in front of a magnetic portion of said coded card and
   a plurality of magnetic means positionable on said problem card on individual ones of the said composite indicum providing said correct answer for identifying the same.

2. An educational aid in accordance with claim 1 including
   an upright easel for holding said coded and problem cards in superimposed relation, said easel including
   stop means for aligning said coded and problem cards so that the individual ones of said composite of indicia providing said correct answer are positioned in front of a magnetic portion of said coded card.

3. An educational aid in accordance with claim 1 wherein said coded card is rotatable to rearrange the relative magnetic and non-magnetic portions when said card is viewed in top plan and
   a second problem card adapted to be superimposed on said coded card, said second problem card having indicia imprinted thereon representing another set of educational problems and the answers thereto, the answers consisting of the composite of individual indicum adapted to be selected from a random-appearing set of individual indicum adjacent the educational problems represented on said problem card, each individual one of said composite indicum providing said answer being positioned in front of a reoriented magnetic portion of said coded card.

4. An educational aid in accordance with claim 1 wherein said magnetic and non-magnetic portions of said coded card include
   a plurality of individual magnetic and non-magnetic elements embedded in holes formed in said card.

5. An educational aid in accordance with claim 1 wherein said magnetic means includes
   a plurality of individual magnets, each magnet having an opening in the central portion thereof whereby the individual indicum selected as the answer to the educational problem can be viewed.

6. An educational aid in accordance with claim 2 wherein said stop means includes a tab extending outwardly from an edge of said easel.

7. An educational aid in accordance with claim 6 wherein said easel further includes means for guiding said coded and problem cards onto said easel and for retaining them in superimposed relation.

8. An educational aid in accordance with claim 7 wherein said guide means includes
   an L-shaped flange in cross-section connected to the top and bottom edges of said easel.

9. An educational aid in accordance with claim 4 wherein said magnetic and non-magnetic elements include
   non-magnetic and magnetic washers interchangably mounted in said holes formed in said coded card.

10. An educational aid in accordance with claim 3 wherein said coded card is rectangular in shape enabling it to be rotatable to provide four different relative orientations of said magnetic and non-magnetic portions whereby said coded card can be used with four different superimposed problem cards having indicia imprinted thereon representing different sets of educational problems.

11. An educational aid comprising
    a coded card having a plurality of magnetic and non-magnetic portions arranged thereon in a predetermined array,
    a problem card superimposed on said coded card, said problem card having indicia imprinted thereon representing a plurality of educational problems and the answers thereto, the answers consisting of the composite of individual indicum adapted to be selected from a set of random-appearing individual indicum adjacent each of said educational problems represented on said problem card, each one of said composite of individual indicum providing an answer being positioned in front of one of said magnetic and non-magnetic portions of said coded card, and a plurality of magnetic means positionable on said problem card to identify said individual ones of the said indicum providing said correct answer.

12. An educational aid comprising a coded card having a plurality of magnetic and non-magnetic portions arranged thereon in a predetermined array, a problem card superimposed on said coded card, said problem card having indicia imprinted thereon representing a plurality of educational problems and the answers thereto, the answers consisting of at least one individual indicum of random-appearing individual indicum adjacent each of said educational problems represented on said problem card, each of said indicum providing an answer being positioned in front of one of said magnetic and non-magnetic portion of said coded card, and magnetic means positionable on said problem card to identify said indicum providing said correct answer.

* * * * *